Aug. 22, 1967 — M. D. CASELLA — 3,337,198
GRID STRUCTURE
Filed April 3, 1964

INVENTOR.
MICHAEL D. CASELLA
BY
Richard Mac Cutcheon
ATTORNEY

United States Patent Office 3,337,198
Patented Aug. 22, 1967

3,337,198
GRID STRUCTURE
Michael D. Casella, Cleveland, Ohio, assignor to Rose Iron Works Inc., Cleveland, Ohio, a corporation of Ohio
Filed Apr. 3, 1964, Ser. No. 357,243
7 Claims. (Cl. 263—47)

The present invention relates to an article of manufacture and more particularly to a processing carrier useful as a work material holding basket or, alternatively, as a relatively flat grid.

In the past for metallurgical, chemical, and mechanical processes, it has been known to use a reticulated or gridiron structure having intersections of the grid secured by various means. For heat treating applications particularly, it is desired to have a low ratio of weight of grid with respect to weight of work material which it can support, so that less heat is required for merely heating process apparatus.

Heretofore, one piece cast grids have been found inordinately heavy, expensive to use, difficult to repair and excessively rigid, that is, lacking in the flexibility necessary to stand up in use, for example with temperature changes due to heating or quenching when part of the grid (e.g., supporting the load) will expand or contract less rapidly than another.

For some of the same reasons, arc or resistance welded grids have been found disadvantageous, the welding failing to properly provide for expansion and contraction of the grid parts due to temperature changes during welding and later during use.

Other constructions have used rivets, swaging, separator tubes and other means to secure grid parts together or position them apart but, for many applications, all have been disadvantageous in one way or another.

It is an object of the present invention to provide simple and inexpensive means for overcoming the above mentioned difficulties.

Another object of the invention is to provide a relatively strong while loosely articulated grid or basket easily capable of taking up expansion and contraction during use with minimal distortion or weakening.

Another object is to provide a fixture useful for metallurgical, mechanical, and chemical processes and characterized by relatively low weight of fixture with respect to relatively high weight of material it is adapted to carry, and which is characterized by the ability to stand up well in use with a relatively long distortion-free life, together with ease of making repairs if need be.

Other objects and advantages will become apparent and the invention may be better understood from consideration of the following description taken in connection with the accompanying drawing, in which.

Figure 1:
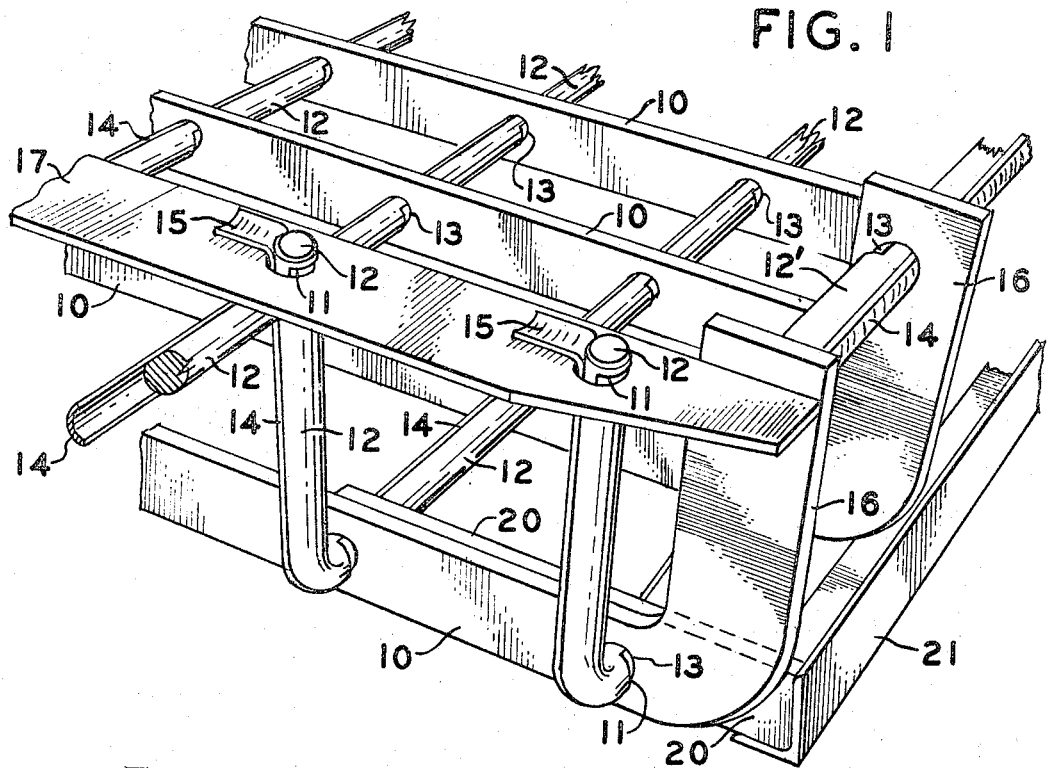
FIG. 1 is a perspective view of a broken away corner portion of a basket for work material heat treating, brazing, drying, and the like, and made according to the invention.

Referring to the drawings, an articulated basket (FIG. 1) or grid (FIGS. 2 and 3) is simply and inexpensively but ruggedly made and provides clearance (see FIG. 2, and FIG. 3 also) for thermal expansion and consequent long useful life, by having perforate load bars 10 locked apart by spacer notches 11 (see FIG. 2) provided in cross members 12. As indicated in FIGS. 2, and 3, and assumed for FIG. 1, a separate notch 11 locks every load bar 10 (although through a clearance) at every cross member 12.

The basket (FIG. 1) or grid (FIG. 2) parts may all be made from the same suitable material such as steel, although for many uses an alloy highly resistant to high temperatures and corrosion, such as a chrome or chrome-nickel steel alloy, may be preferred.

Holes 13 having a generally rounded contour are provided in the load bars 10 for receiving the cross members 12, there being sufficient clearance for introducing the cross members until the latter have had their notches fall into place around contiguous portions of the runners 10. Into such clearances, as found aligned (FIG. 2) or as used together (FIG. 1), are slipped thin lock strips 14 which may desirably be arcuate in section for mating engagement with both the rounded contour of the holes 13 and the adjacent rounded surface of the cross members 12 as shown in FIG. 1. The lock strips 14 may be fastened against removal by bending the end portions of the strips to form holding tabs 15.

Figure 2:
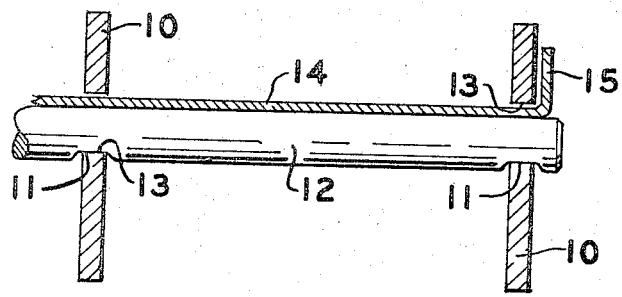
FIG. 2 is a broken away detail of a load bar, tie bar and lock strip assembly for providing a lock and clearance type grid according to one embodiment of the invention.
Figure 3:
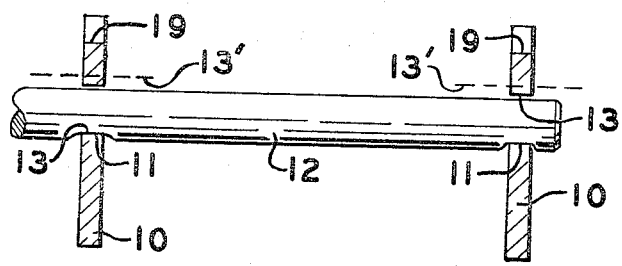
FIG. 3 is a detail showing a modification.

I wish it to be understood that a flat grating, as is indicated in the "portion" showings in FIGS. 2 and 3, might be used as it is. Or it might be slipped into angle or other shaped sides to form a basket. Alternatively, it could have its own components upturned at their lateral extents to form an integral "basket" as in FIG. 1, where the runners 10 terminate in upstanding portions 16 finally spaced apart by elevated cross members one of which is shown at 12' and which is notched as before and held in place by a lock strip 14 as before. The lower cross members 12 also turn up, and they terminate in side rails, one of which is shown at 17.

For the FIG. 2 arrangement (hence for the assumed FIG. 1 arrangement as well) the root, or limiting dimension, of each notch 11 can be 101 to 150% of the thickness dimension of the runner 10 which it holds, transversely through the clearance.

Referring to FIG. 3, there is still a separate notch 11 for spacing and locking every load bar 10 at every intersection with a cross member 12, but in FIG. 3, the expense of the FIG. 1 and 2 locking strips (14) is completely eliminated by "coining" down depressions 19 on an outer surface of each load bar 10 adjacent each of its engagements with a cross member 12 thus to take up the radial clearance and lock the members together. That is to say, although when cross member 12 was first inserted, the top side of each opening 13 may have been as indicated by the dash lines 13', after exerting a deforming pressure to form each dimple 19, the top of each opening 13 has been pushed down to the top of the cross member 12, thus locking the notches 11 which engage each respective load bar 10. An advantage of the FIG. 3 arrangement is that for many applications it is desirable because of its low initial cost.

Accessories which vary with uses and individual customer requirements may optionally be used. Conventionally, accessories sometimes used include stacking rails, pusher bars, handles or other lifting devices, frames and other supporting structures, and liners. In FIG. 1 I have shown a relatively short interlock bar 20 (of which there would be four per basket). Angle bumpers (of which one is shown at 21, welded to bar 20) serve as both pusher bars and stacking rails (so that like baskets may be superimposed one above the other for processing or for storage). Preferably, such angle bumpers are welded to the rest of the structure at just a few points (so as not to interfere materially with contractions or expansions). Preferably, too, the interlock bars are locked into notches provided in the cross members, in the same manner as are the load bars.

There is thus provided articles of the class described capable of meeting the objects above set forth. The articulated joints minimize heat stresses, as is always advantageous since customers may merely order "processing baskets" or "grids" without the supplier (or sometimes even the customer) knowing that they will ultimately be subjected to processes involving wide swings of temperature. Still a high strength to weight ratio is achieved, and all necessary structural rigidity is maintained, neither the small notches 11 in the cross members, nor the holes 13 through the center of each on-edge beam (that is, through the point of minimum stress) materially affecting the strength of these members in their particular application.

While I have illustrated and described particular embodiments, various modifications may obviously be made without departing from the true spirit and scope of the invention which I intend to have defined only by the appended claims taken with all reasonable equivalents.

I claim:

1. An articulated long-lived grid structure suited for use as an article supporting processing carrier comprising a plurality of parallel spaced article supporting beam members of substantially greater depth than width, each said beam member having a plurality of openings therethrough at longitudinally spaced intervals, such openings in each beam member being aligned with corresponding openings in the other said beam members, such openings being of rounded contour, elongated generally round spacer tie bars extending through such aligned openings and having notches therein interengaging each said beam member, and elongated locking members extending through such openings in close engagement with both said tie bars and the rounded contours of such openings for maintaining such interengaging relationship, said locking members having curved surfaces mating with such contours.

2. The grid structure of claim 1 wherein such notches have curved bottom portions in mating engagement with the rounded contours of such openings.

3. The grid structure of claim 1, further comprising an elongated bumper member, and means for securing said bumper member to said grid structure adjacent one end of said beam members, including a pair of interlock bars having one end extending outwardly beyond said one end of said beam members to which said bumper member is secured, said interlock bars being substantially shorter than said beam members and having several axially spaced openings therein in alignment with the openings in said beam members adjacent said one end for passage of several of said spacer tie bars and locking members therethrough, said several spacer tie bars having additional aligned notches therein for receipt of a portion of the wall of said interlock bar openings, said several locking members being adapted to maintain said interlock bars within said additional notches.

4. The grid structure of claim 1 wherein said spacer tie bars have upturned end portions outwardly of said beam members, aligned notches in said upturned end portions, and side rails having spaced apart openings therein for receipt of said upturned end portions with a portion of the wall of such rail openings disposed in such notches, and means inserted in such openings in said side rails for maintaining said side rails within such notches in said tie bar end portions.

5. The grid structure of claim 4 wherein said last-mentioned means are continuations of said elongated locking members, said lock members having bent end portions corresponding to the bent end portions of said spacer tie bars.

6. The grid structure of claim 4 wherein said beam members also have upturned end portions outwardly of said spacer tie bars, aligned openings through said upturned end portions of said beam members, additional bar members extending through such last-mentioned aligned openings, said additional bar members having axially spaced notches therein for receipt of a portion of the wall of such last-mentioned openings, and means for maintaining said upturned end portions of said beam members within such notches of said additional bar members.

7. The grid structure of claim 1 wherein said elongated locking members are arcuate in cross-section for mating contact with the contours of both said spacer tie bars and such openings in said beam members.

References Cited

UNITED STATES PATENTS

| 1,309,698 | 7/1919 | Scherbner | 52—667 |
| 1,843,946 | 2/1932 | Delano | 263—47 |
| 2,084,118 | 6/1937 | Zabriskie | 52—667 |
| 3,025,045 | 3/1962 | Ornitz | 263—47 |
| 3,092,375 | 6/1963 | Bixby | 220—19 |
| 3,179,393 | 4/1965 | Bixby | 220—19 |

HAROLD D. WHITEHEAD, *Primary Examiner.*